United States Patent [19]

Bower

[11] 3,761,815

[45] Sept. 25, 1973

[54] COMBINATION OPTICAL AND RADIO APPARATUS

[76] Inventor: Donald W. Bower, 222 Palmetto Dr., Miami Springs, Fla.

[22] Filed: Mar. 20, 1972

[21] Appl. No.: 236,365

[52] U.S. Cl. .................... 325/16, 325/111, 325/352, 325/361

[51] Int. Cl. .................... H04b 1/38

[58] Field of Search .................... 325/15, 16, 118, 325/361, 352, 353, 111

[56] References Cited

UNITED STATES PATENTS

| | | | |
|---|---|---|---|
| 3,277,303 | 10/1966 | Jensen et al. | 325/16 |
| D206,462 | 12/1966 | Petrusek | 325/16 |
| 3,118,145 | 1/1964 | Nee | 325/361 |

*Primary Examiner*—Albert J. Mayer
*Attorney*—Eugene F. Malin

[57] ABSTRACT

The combination of an optical viewing instrument and radio device includes at least one refracting telescope connected to a radio device, which includes a radio receiver or a radio receiver-transmitter. The optical instrument and radio device are combined into a single unit that is hand supported with a finger control system for controlling the telescope focusing tubes and the radio on-off, volume and tuning controls. The finger control system allows a user to adjust the visual and audio controls while visually viewing a field of activity and receiving or transmitting audible announcements or instructions from another viewing said field. The apparatus includes a hand supporting portion adjacent the finger control system to allow a user to support the apparatus in relation to his eyes, ears and mouth, as well as control the entire operation of the apparatus by solely using his hands and fingers. The apparatus also includes an adjustable focusing speaker that directs the radio output into one of the user's ears. The apparatus may also include an ear speaker that is insertable into the user's ear.

3 Claims, 4 Drawing Figures

F

COMBINATION OPTICAL AND RADIO APPARATUS

BACKGROUND OF THE INVENTION

This invention relates to a combined optical and radio apparatus, and, more particularly, to an apparatus including a combination binocular-radio with finger accessible focusing, volume, tuning controls, and on-off switch.

In the past, various optical instruments have been utilized to view various fields of play and sporting events. Also, various radio systems have been carried in order to hear instructions or announcements from persons at other special locations viewing said field of play or transmitting data to other persons. The two prior art systems, when used together, have proved to be awkward, bulky, difficult to adjust, and difficult to hear or be heard. Such systems required straps or other components to be connected to the radio receiver and the user, in order to support the radio, or connected between the optical instrument and the user to support the optical instrument.

BRIEF DESCRIPTION OF THE INVENTION

The present invention relates to a new and improved combination apparatus and includes an optical instrument and radio device. The combination apparatus includes a casing with hand support portions. The optical instrument includes a binocular with two refracting telescopes mounted on a single frame and containing a focusing system with both focusing tubes simultaneously adjustable by a single finger controlable screw connected adjacent to the hand support portions. The radio device includes a telescoping directional speaker and finger controllable control means. The combination optical instrument and radio device are solely hand supported and directable to visually view any field of activity while controlling the optical instrument and radio with fingertip control and positioning a directional speaker adjacent the user's ear to receive audible announcements or instructions. When a radio receiver-transmitter is used in combination with the optical instrument, the apparatus allows a user to support the apparatus and control the entire operation of the combination optical instrument and radio device with his or her hands and fingers. The hands of the user supports and moves the apparatus in relation to the user's eyes, ears and mouth without the necessity of other connections to the user's body and the fingers are positioned for instant control of the focusing, turning the radio on or off, and for controlling volume and tuning of the apparatus.

It is an object of this invention to provide a combination optical radio apparatus.

Another object of this invention is to provide a telescope with finger controlled focusing and a radio with finger control and volume and tuning in a single hand-supported unit.

Another object of this invention is to provide a telescope radio transceiver with an ear speaker that can be used in noisy environments.

Another object of this invention is to provide a combination optical-radio apparatus with a directed speaker on an adjustable pedestal that may be placed adjacent one of the user's ears.

A further object of this invention is to provide a combination binocular and radio with fingertip control in a single hand supported casing.

In accordance with these and other objects which will be apparent hereinafter, the instant invention will now be described with particular reference to the accompanying drawings.

PREFERRED EMBODIMENT OF THE INVENTION

Figure 1:
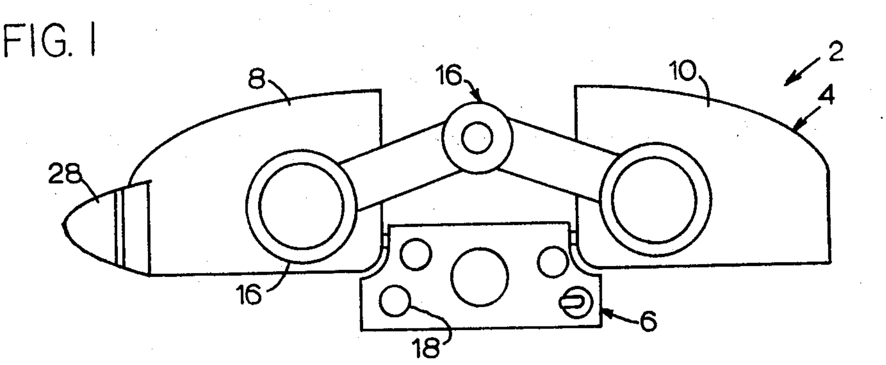
FIG. 1 is a rear side view of the apparatus.
Figure 2:
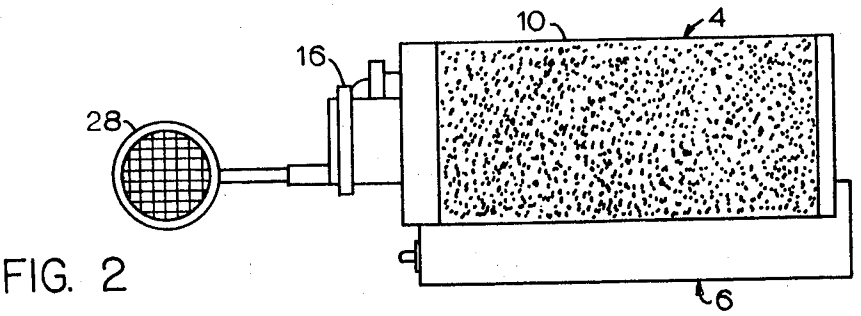
FIG. 2 is a side view of the apparatus as shown in FIG. 1.
Figures 3, 4:
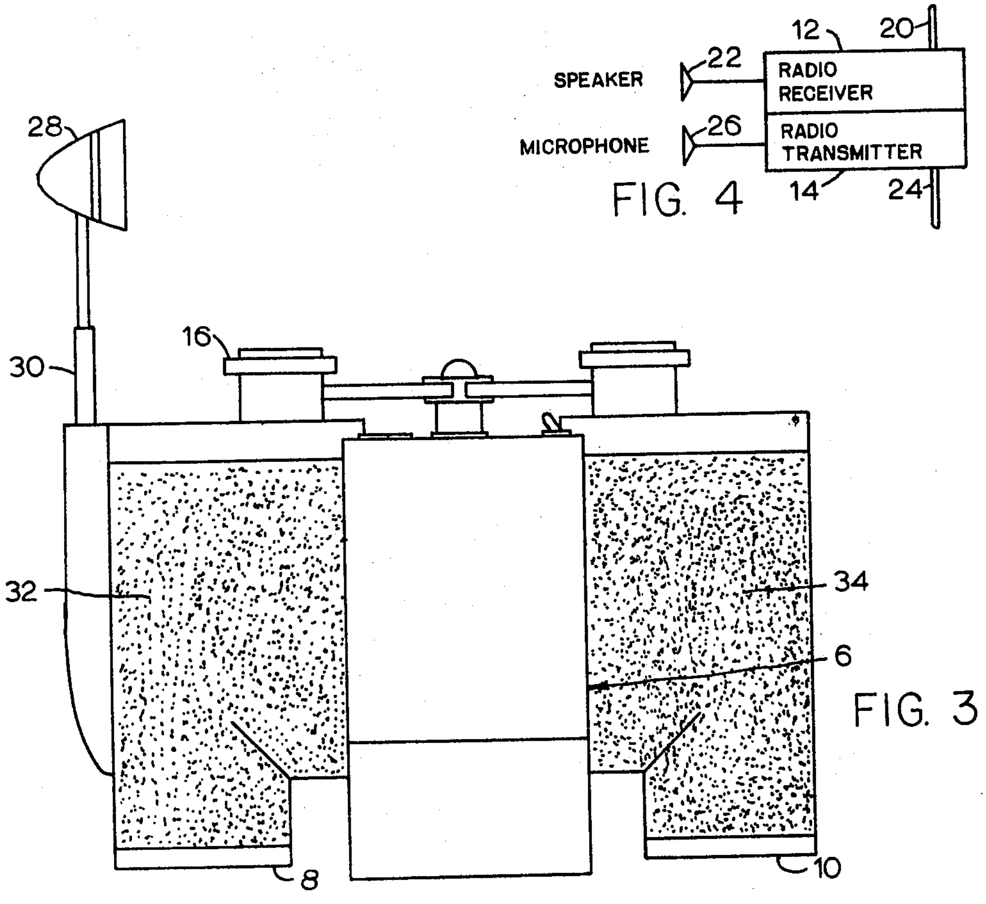
FIG. 3 is a bottom view of the apparatus as shown in FIG. 1.
FIG. 4 is a schematic of the radio-receiver transmitter device in association with the focusing screw.

Referring now in detail to the drawing, wherein the preferred embodiment of the invention is shown, and referring particularly to FIGS. 1, 2, and 3, the combination optical and radio apparatus, generally designated by numeral 2, includes an optical instrument 4 and radio device 6. The optical instrument is shown as a binocular with two telescopes 8 and 10 connected to a radio receiver 12 or a radio receiver 12 including transmitter 14. The optical instrument includes a binocular with two refracting telescopes mounted on a single frame and containing a focusing system with both focusing tubes simultaneously adjustable by a signle finger controllable screw. The radio device includes a telescoping directional speaker as well as fingertip control means. The apparatus includes hand support portions 32 and 34. The optical instrument 4 and radio device 6 are positional in order to allow a user to visually view any field of activity while receiving or transmitting audible announcements or instructions. The hand support portions, the fingertip optical instrument controls 16 and the fingertip radio device controls 18 allow the user to support and control the entire apparatus with his or her hands and to mainpulate the controls 16 and 18 by their fingers. The user's hands may adjust the apparatus in relation to the user's eyes, ears and mouth without the necessity of other connections to the user's body. Also, the location of the focusing control means 16 for the binocular and the volume and tuning control means 18 for the radio are positioned for easy access and control by the user's fingers. The transceiver may include a speaker jack for attaching an ear plug type speaker, not shown, that may be plugged into a user's ear.

Referring now to FIG. 4, the receiver 12 includes an antenna 20 and a speaker 22. The transmitter 14 includes an antenna 24 and microphone 26. The radio speaker 22 may include a non-directional speaker and a directional speaker 28 mounted on telescoping frame member 30.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A combination optical telescope and radio receiver with a telescoping speaker ear piece comprising:

a telescope casing including a telescope with an adjustable focusing tube, said casing including a hand holding means to support said casing in position with the proximal end of the casing adjacent a user's eye, a focusing tube control means connected to each said focusing tube to adjust to position of said focusing tube, said focusing tube control means including a finger controllable actuating means projecting out of the top of said telescope casing, to be actuated by the fingers of a user's hand, a radio including a radio frequency receiver connected to the bottom of combination optical telescope and radio receiver, said receiver including a speaker and radio control means connected to said receiver to provide volumn control, said radio control means including thumb controllable actuating means projecting out of said radio to be actuated by the thumb of said user's hand, an audio directional speaker housing with said speaker positioned therein, and an adjustable telescoping generally non-flexible, rod connected to the side of said telescope casing, said speaker housing connected to the distal end of said rod and extendible toward an ear of said user.

2. A combination optical telescope and radio receiver as set forth in claim 1 wherein:

said telescope casing is a binocular casing including two telescopes with two adjustable focusing tubes, and two hand holding means.

3. A combination optical telescope and radio receiver as set forth in claim 2 wherein, said speaker housing is rotatably adjustable on said rod to direct the sound output toward the ear of the user.

* * * * *